(12) United States Patent
Hsieh et al.

(10) Patent No.: US 7,843,517 B2
(45) Date of Patent: Nov. 30, 2010

(54) TOUCH PANEL HAVING SENSING SPACERS

(75) Inventors: Ming-Che Hsieh, Taipei (TW); Shih-Yu Wang, Changhua County (TW); Chih-Wei Chu, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 111 days.

(21) Appl. No.: 12/324,899

(22) Filed: Nov. 28, 2008

(65) Prior Publication Data

US 2010/0053534 A1 Mar. 4, 2010

(30) Foreign Application Priority Data

Aug. 27, 2008 (TW) ............................... 97132792 A

(51) Int. Cl.
  *G02F 1/1335* (2006.01)
  *G02F 1/00* (2006.01)
  *G02B 5/20* (2006.01)
(52) U.S. Cl. .......................... 349/12; 349/106; 349/155; 430/7; 345/173
(58) Field of Classification Search ...................... 430/7; 349/153, 155, 106, 110
See application file for complete search history.

(56) References Cited

U.S. PATENT DOCUMENTS

| 7,156,942 | B2 * | 1/2007 | McCormick et al. | ......... 156/249 |
| 7,483,016 | B1 * | 1/2009 | Gettemy et al. | ............. 345/173 |
| 2003/0117476 | A1 | 6/2003 | Cross et al. | |
| 2004/0183788 | A1 | 9/2004 | Kurashima et al. | |
| 2008/0239214 | A1 * | 10/2008 | Lee et al. | ...................... 349/106 |
| 2009/0268131 | A1 * | 10/2009 | Tsai et al. | ..................... 349/106 |
| 2009/0278810 | A1 * | 11/2009 | Ma et al. | ...................... 345/173 |
| 2010/0001965 | A1 * | 1/2010 | Wang et al. | .................. 345/173 |
| 2010/0026657 | A1 * | 2/2010 | Gettemy et al. | ............. 345/174 |

FOREIGN PATENT DOCUMENTS

| CN | 101153997 | 4/2008 |
| CN | 101241255 | 8/2008 |
| JP | 2004-139162 | 5/2004 |
| TW | I292633 | 1/2008 |
| WO | 2005/096319 | 10/2005 |

OTHER PUBLICATIONS

"1st Office Action of China counterpart application", issued on Aug. 7, 2009, p. 1-p. 8.

* cited by examiner

*Primary Examiner*—Akm E Ullah
(74) *Attorney, Agent, or Firm*—Jianq Chyun IP Office

(57) ABSTRACT

A touch panel including a first substrate, a second substrate, a sealant, a liquid crystal layer, a main spacer, a first sensing spacer, a second sensing spacer, a first opposite electrode and a second opposite electrode is provided. The first substrate has a central area and a peripheral area. The second substrate is disposed opposite to the first substrate. The first sensing spacer is disposed on the central area and between the first and the second substrates. The second sensing spacer is disposed on the peripheral area and between the first and the second substrates. There's a first sensing gap between the first sensing spacer and the first opposite electrode disposed corresponding to the first sensing spacer. There's a second sensing gap between the second sensing spacer and the second opposite electrode disposed corresponding to the second sensing spacer. The first sensing gap is larger than the second sensing gap.

15 Claims, 6 Drawing Sheets

US 7,843,517 B2

TOUCH PANEL HAVING SENSING SPACERS

CROSS-REFERENCE TO RELATED APPLICATION

This application claims the priority benefit of Taiwan application serial no. 97132792, filed on Aug. 27, 2008. The entirety of the above-mentioned patent application is hereby incorporated by reference herein and made a part of this specification.

BACKGROUND OF THE INVENTION

1. Field of the Invention

The present invention relates to a display panel, and particularly relates to a touch panel.

2. Description of Related Art

At present, a display is one of the most popular among various consumers' optoelectronic products. As display technology advances, the use of displays is making our life more convenient than ever. Hence, the design of touch panels, especially, has become the representative of convenience. By directly touching the display frame, a user may utilize various functions of the touch panel, which simplifies the complexity of operating the touch panel.

Generally speaking, touch panels are categorized into two types, plug-in type and built-in type, according to the structures thereof. A built-in type product is usually thinner and lighter than a plug-in type product. Hence, built-in type touch panels are commonly applied in all kinds of portable electronic devices.

FIG. 1A is a cross-sectional view illustrating a portion of a conventional built-in touch panel. Referring to FIG. 1A, a built-in touch panel 100 includes a first substrate 110, a second substrate 120, a liquid crystal layer 140, a main spacer 150, a sensing spacer 160, an opposite electrode 170, a transparent conductive layer 182, a shielding layer 184, a plurality of color filter layers 184', a protective layer 186, a first metal layer M1, a gate insulating layer GI', an amorphous silicon layer AS, and a second metal layer M2.

The second substrate 120 is disposed opposite to the first substrate 110. The liquid crystal layer 140 and the main spacer 150 are arranged between the first substrate 110 and the second substrate 120. The sensing spacer 160 is disposed on the second substrate 120. The opposite electrode 170 is arranged on the first substrate 110 and corresponds to the sensing spacer 160, wherein the opposite electrode 170 is disposed on the protective layer 186 and contacts the protective layer 186. The transparent conductive layer 182 is disposed on the second substrate 120 and covers the main spacer 150 and the sensing spacer 160.

Generally speaking, the main spacer 150 and the sensing spacer 160 are formed by performing a photomask process, so as to simultaneously complete the fabrication of the main spacer 150 and the sensing spacer 160. However, because of the limitation of the photolithography process, the discrepancy between the height of the sensing spacer 160 and the height of the main spacer 150 is small or none.

Referring to FIG. 1A, when the built-in touch panel 100 is not touched, the shortest distance between the transparent conductive layer 182 covering the sensing spacer 160 and the opposite electrode 170 is a sensing gap g'. When the user touches the built-in touch panel 100, an electrical change is generated by the contact of the transparent conductive layer 182 covering the sensing spacer 160 and the opposite electrode 170. Thereby, the built-in touch panel 100 determines the area touched by the user.

In the conventional built-in touch panel 100, the sensing gap g' remains the same or almost the same in every area. When the user touches an area having lower sensitivity, the user needs to apply larger stress so that the transparent conductive layer 182 on the sensing spacer 160 may contact the opposite electrode 170, i.e. to make the sensing gap g' become 0. However, the transparent conductive layer 182 may be broken if the user applies excessive stress to the built-in touch panel 100, as indicated by the breaking position B1 and B2 in FIG. 1B.

SUMMARY OF THE INVENTION

The present invention provides a touch panel having sensing spacers of various heights disposed therein for enhancing the touch sensitivity of a low-sensitive area in the touch panel.

The present invention further provides a touch panel comprising sensing gaps of various sizes for enhancing the touch sensitivity of a low-sensitive area in the touch panel.

The present invention further provides a touch panel using an organic conductive material to fabricate a sensing spacer for varying the height of the sensing spacer and the size of a sensing gap.

The present invention provides a touch panel including a first substrate, a second substrate, a sealant, a liquid crystal layer, a main spacer, a first sensing spacer, a second sensing spacer, a first opposite electrode, and a second opposite electrode. The first substrate has a central area and a peripheral area, and the second substrate is disposed opposite to the first substrate. The sealant is disposed on the peripheral area for bonding the first and the second substrates. The liquid crystal layer, the main spacer, the first sensing spacer, and the second sensing spacer are arranged between the first and the second substrates. The first sensing spacer is disposed on the central area, and the second sensing spacer is disposed on the peripheral area. A first sensing gap is arranged between the first sensing spacer and the first opposite electrode disposed corresponding to the first sensing spacer. A second sensing gap is arranged between the second sensing spacer and the second opposite electrode disposed corresponding to the second sensing spacer. The first sensing gap is larger than the second sensing gap.

The present invention further provides a touch panel including a first substrate, a second substrate, a sealant, a liquid crystal layer, a main spacer, a first sensing spacer, and a second sensing spacer. The first substrate has a central area and a peripheral area, and the second substrate is disposed opposite to the first substrate. The sealant is disposed on the peripheral area for bonding the first and the second substrates. The liquid crystal layer, the main spacer, the first sensing spacer, and the second sensing spacer are arranged between the first and the second substrates. The first sensing spacer is disposed on the central area and the second sensing spacer is disposed on the peripheral area. The second sensing spacer is higher than the first sensing spacer.

The present invention further provides a touch panel including a first substrate, a second substrate, a sealant, a liquid crystal layer, a main spacer, and a sensing spacer. The second substrate is disposed opposite to the first substrate. The sealant is used for bonding the first and the second substrates. The liquid crystal layer and the main spacer are disposed between the first substrate and the second substrate. The sensing spacer is disposed on the first substrate or the second substrate, and may be formed by multiple organic conductive layers.

In an embodiment of the present invention, at least one of the first sensing spacer and the second sensing spacer is formed by multiple organic conductive layers.

In an embodiment of the present invention, at least one of the first opposite electrode and the second opposite electrode is formed by multiple organic conductive layers.

In an embodiment of the present invention, the first sensing gap or the second sensing gap ranges from 0.3 μm to 0.8 μm.

In an embodiment of the present invention, at least one of the first sensing spacer and the second sensing spacer has a spherical top or a blunt top.

In an embodiment of the present invention, the first sensing spacer and the second sensing spacer are disposed on a transparent conductive layer and contact the transparent conductive layer.

In an embodiment of the present invention, the touch panel further comprises a first shielding layer, a second shielding layer, and a third shielding layer disposed on the second substrate. In an embodiment, the first shielding layer, the second shielding layer, and the third shielding layer are arranged corresponding to the first sensing spacer, the second sensing spacer, and the main spacer respectively.

In an embodiment of the present invention, the touch panel further comprises a protective layer and a plurality of transparent electrodes. The protective layer disposed on the first substrate and the transparent electrodes disposed on the protective layer are arranged to correspond to the first sensing spacer and the second sensing spacer respectively. In a preferable embodiment, the first opposite electrode and the second opposite electrode are separately disposed on the transparent electrodes.

In an embodiment of the present invention, a material of the organic conductive layer may be selected from a group of poly(3,4-ethylene dioxythiophene)/poly(styrene sulfonate) (PEDOT/PSS), polyaniline, polypyrrole, polythiophene, polyacetylene, polyphenyl, polyfuran, polyselenophene, isothianaphthene, polyphenylsulfide, polystyrene, polythienylstyrene, polynaphthalene, polyanthracene, polypyrene, polyazulene, phthalocyanine, pentacene, hemicyanine dye, and 3,4-polyethylene dioxythio phene (PEDT), but the present invention is not limited thereto.

According to the present invention, the sensing spacers in the touch panel may be fabricated by performing an inkjet process, so as to vary the heights of different sensing spacers simultaneously. Moreover, the present invention may apply the sensing spacers of different heights to overcome the problem that the peripheral area of the touch panel has lower touch sensitivity. From another aspect, the touch sensitivity of the peripheral area in the touch panel may also be enhanced by forming sensing gaps of different sizes. By the means mentioned above, the present invention not only helps to improve the low touch sensitivity of the peripheral area in the touch panel but also prevents the breaking of the transparent conductive layer caused by excessive stress from the user.

To make the above features and advantages of the present invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
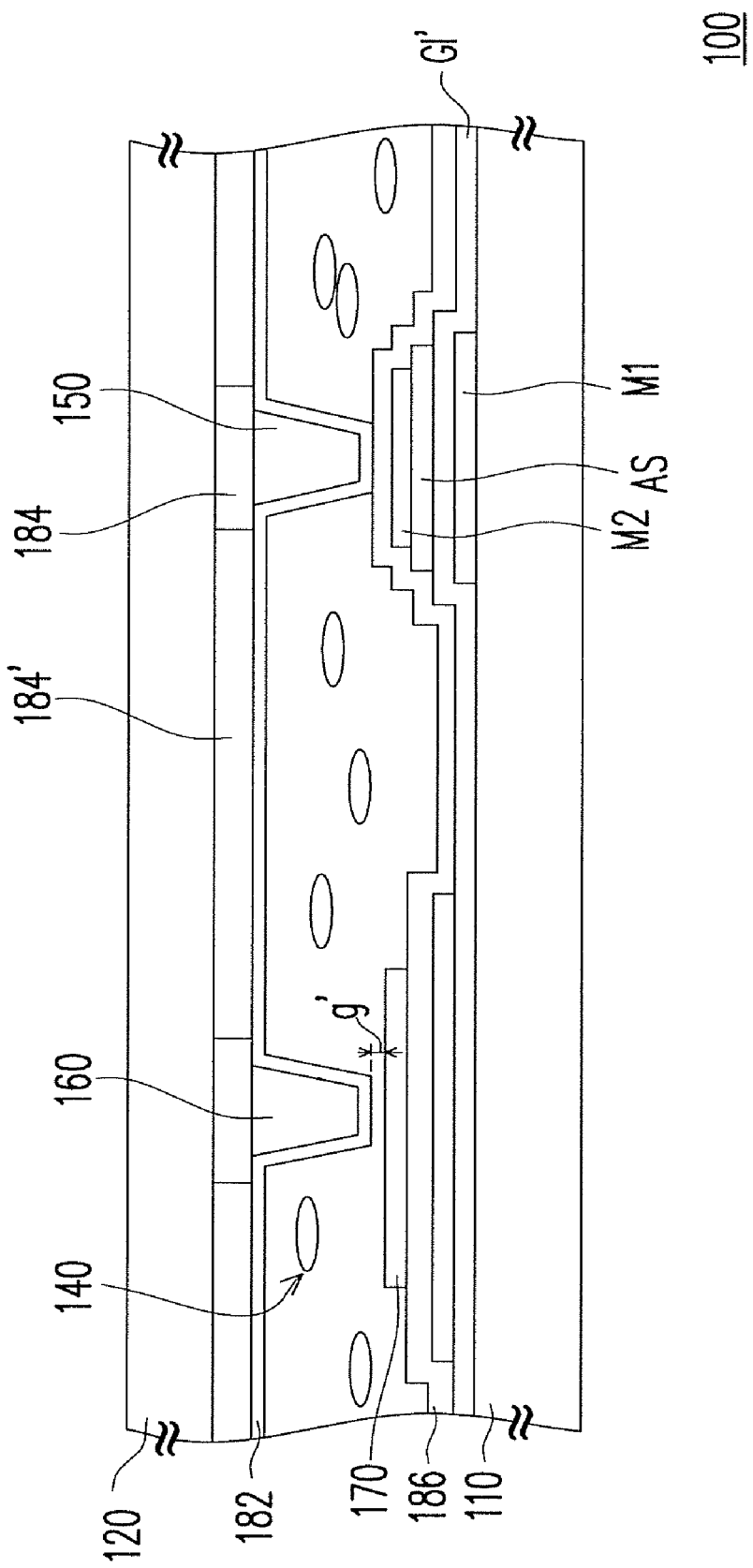
FIG. 1A is a cross-sectional view illustrating a portion of a conventional built-in touch panel.
Figure 1B:
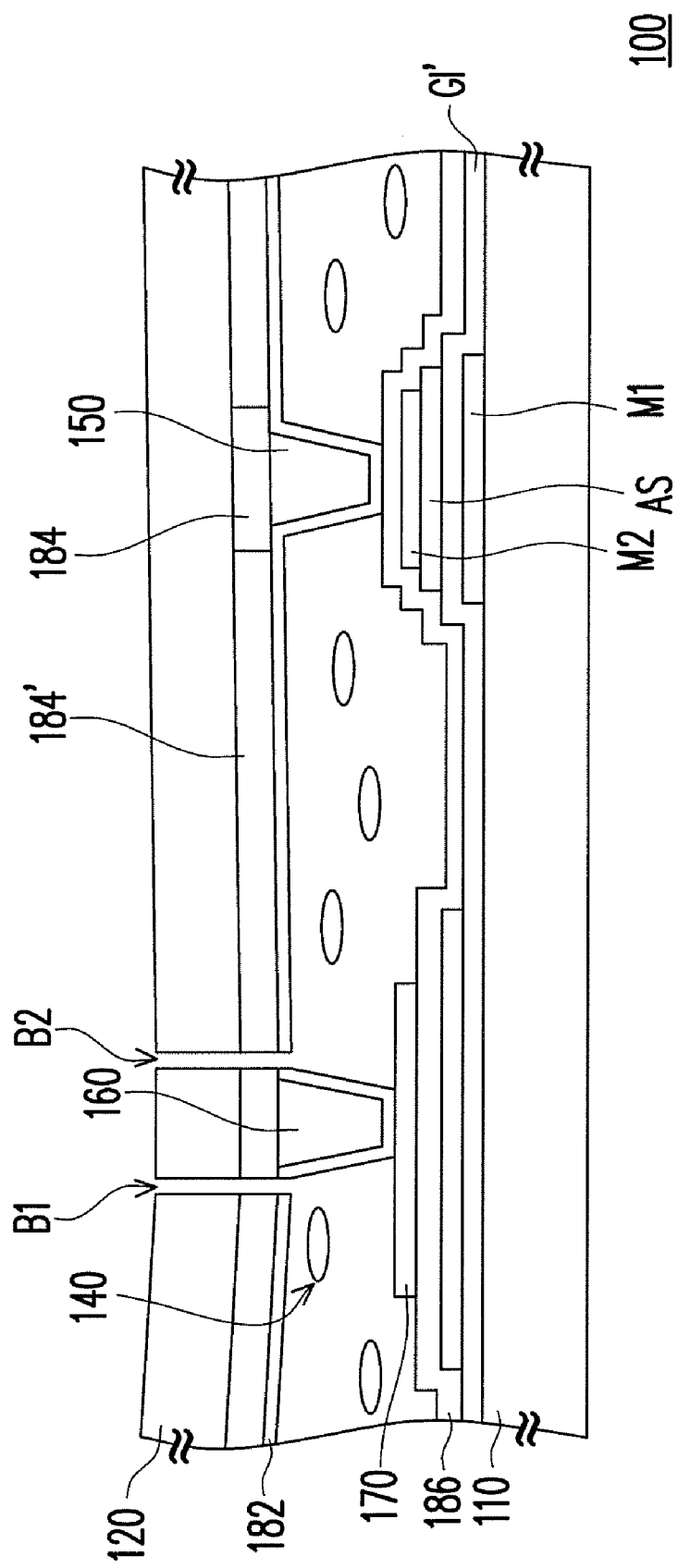
FIG. 1B is a cross-sectional view illustrating a portion of the built-in touch panel in FIG. 1A damaged by excessive stress.
Figure 2A:
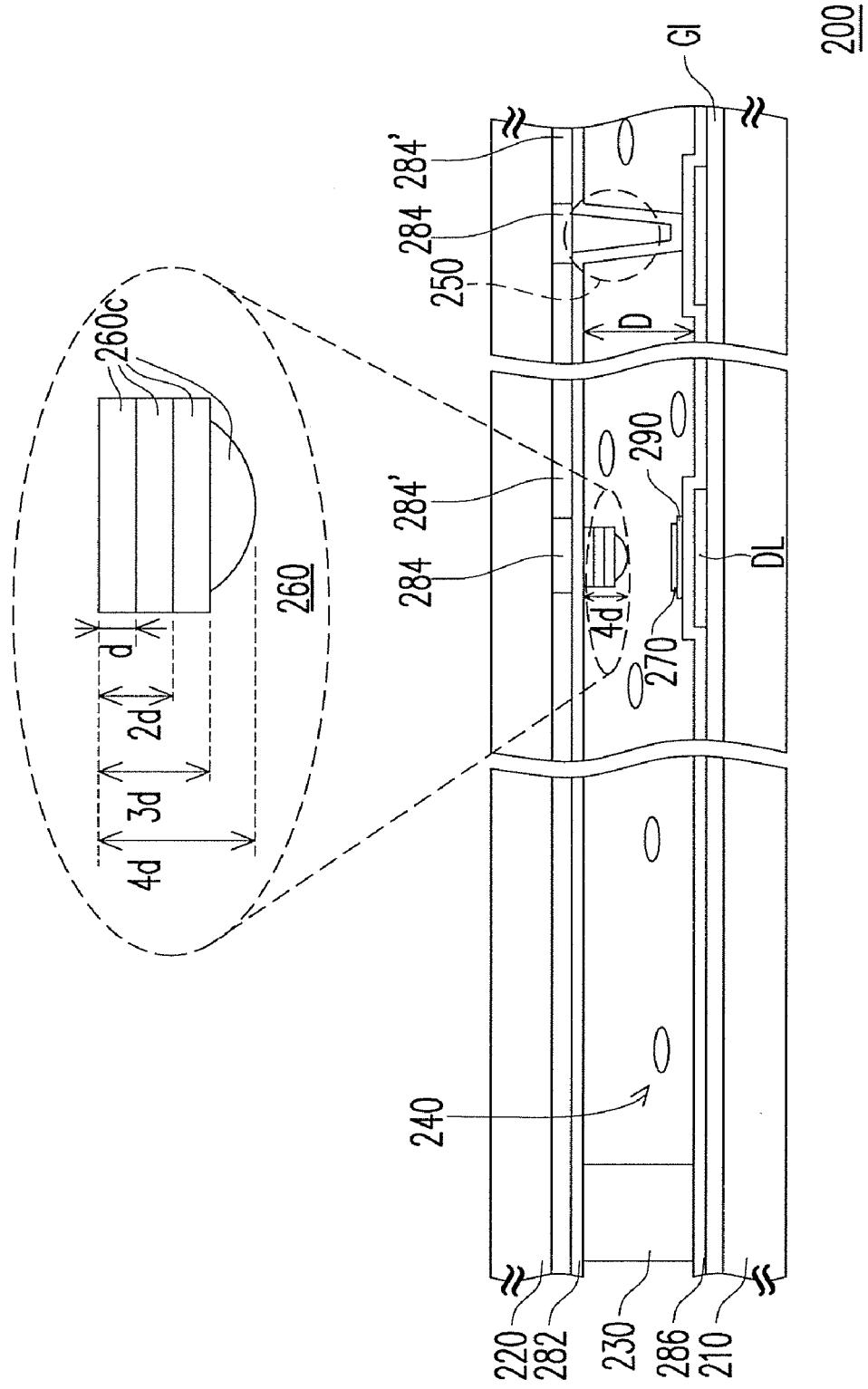
FIG. 2A is a cross-sectional view illustrating a portion of a touch panel in the first embodiment of the present invention.

FIG. 2A is a cross-sectional view illustrating a portion of a touch panel in the first embodiment of the present invention. Referring to FIG. 2A, a touch panel 200 of the embodiment includes a first substrate 210, a second substrate 220, a sealant 230, a liquid crystal layer 240, a main spacer 250, a sensing spacer 260, a transparent electrode 290, and an opposite electrode 270.

A pixel array is disposed on the first substrate 210, wherein the pixel array includes a plurality of active elements, a plurality of scanning lines, a plurality of data lines DL, and a plurality of pixel electrodes. In order to facilitate the illustration of the embodiment, only one data line DL is illustrated in FIG. 2A and the other elements are omitted. Persons with ordinary skill in the art should understand the actual positions and functions of the omitted elements. Hence, the details thereof are not described here. As shown in FIG. 2A, the data line DL is disposed above a gate insulating layer GI. The second substrate 220 is disposed opposite to the first substrate 210. The sealant 230 is used for bonding the first substrate 210 and the second substrate 220. The liquid crystal layer 240 and the main spacer 250 are disposed between the first substrate 210 and the second substrate 220. The sensing spacer 260 is arranged on the second substrate 220.

According to a preferable embodiment, the opposite electrode 270 and the transparent electrode 290 are disposed on the first substrate 210 and arranged corresponding to the sensing spacer 260, as shown in FIG. 2A. The opposite electrode 270 is above the data line DL and the gate insulating layer GI, and the transparent electrode 290 is arranged between the opposite electrode 270 and the date line DL, but the present invention is not limited thereto. Any designer may dispose the opposite electrode 270 above the scanning lines (not shown) or other suitable elements, or dispose the opposite electrode 270 between the transparent electrode 290 and the data line DL, the scanning lines, or other elements to meet the requirements of products.

In a preferable embodiment, the transparent electrode 290 and the opposite electrode 270 are electrically connected for transmitting an electrical change or a sensing signal generated by a contact of the sensing spacer 260 and the opposite electrode 270 caused by a user touching the touch panel 200. In addition, the designer may vary a pattern of the opposite electrode 270 per the requirements of products to substitute for the functions of the transparent electrode 290, and further simplify the fabricating process.

Referring to FIG. 2A, a transparent conductive layer 282 is disposed on the second substrate 220, and the sensing spacer 260 is disposed on the transparent conductive layer 282 and contacts the transparent conductive layer 282. In a preferable embodiment, shielding layer 284 are disposed on the second substrate 220 and arranged corresponding to the sensing spacer 260 and the main spacer 250 respectively. Moreover, pluralities of color filter layers 284' are disposed on the second substrate 220. The color filter layers 284' and the shielding layer 284 are arranged alternately. Further, a protective layer 286 is disposed on the first substrate 210, and the opposite electrode 270 is disposed on the protective layer 286 and contacts the protective layer 286 or the transparent electrode 290 on the protective layer 286.

As shown in FIG. 2A, the transparent conductive layer 282 may be electrically connected with the sensing spacer 260 and electrically insulated from the opposite electrode 270 when not operating. When the user touches the touch panel 200, an electrical change is generated by a contact of the sensing spacer 260 and the opposite electrode 270. Thereby, the touch panel 200 determines the area touched by the user. In brief, the sensing spacer 260 and the opposite electrode 270 are respectively disposed on the second substrate 220 and the first substrate 210 to correspond to each other, so as to sense the touched area in the touch panel 200.

The sensing spacer 260 may be formed by multiple organic conductive layers 260c. The organic conductive layers 260c are usually formed by a conductive material having softer texture for easing a force which occurs when the sensing spacer 260 contacts the opposite electrode 270.

According to a preferable embodiment, a material of the organic conductive layers 260c may be selected from a group of poly(3,4-ethylene dioxythiophene)/poly(styrene sulfonate) (PEDOT/PSS), polyaniline, polypyrrole, polythiophene, polyacetylene, polyphenyl, polyfuran, polyselenophene, isothianaphthene, polyphenylsulfide, polystyrene, polythienylstyrene, polynaphthalene, polyanthracene, polypyrene, polyazulene, phthalocyanine, pentacene, hemicyanine dye, and 3,4-polyethylene dioxythio phene (PEDT), but the present invention is not limited thereto.

Because the sensing spacer 260 is formed by the organic conductive material having softer texture, an ink-jet process may be applied to sequentially form the sensing spacer 260 on the second substrate 220. In addition, through controlling the volume and times of jetting the organic conductive material in each ink-jet process, the height of the sensing spacer 260 may be controlled to reach a predetermined value or fall within a predetermined range.

As shown in FIG. 2A, a first ink-jet process is performed on the second substrate 220 to form one organic conductive layer 260c having a height d. Then, a second ink-jet process is performed to form another organic conductive layer having the height d. Thus, the height is 2d in total. Accordingly, after four times of the ink-jet process, four organic conductive layers 260c having a total height of 4d are formed. In this embodiment, the sensing spacer 260 is formed by the four organic conductive layers 260c, and the height of the sensing spacer 260 is 4d.

In practice, the organic conductive layers 260c are not restricted to four layers. The designer may vary the volume and times of jetting the organic conductive material during the ink-jet process based on the requirements of products, so as to control the number and height of the organic conductive layers 260c. Moreover, other fabricating methods or ink-jet controlling processes may also be used to form the sensing spacer 260 as long as the shape or height of the sensing spacer 260 can be controlled. Persons with ordinary skill in the art may adjust the height of the organic conductive layer 260c formed in each ink-jet process according to their requirements.

According to a preferable embodiment, the aforesaid material of the organic conductive layers 260c and the aforesaid ink-jet process may be combined to fabricate the opposite electrode 270, so that the height of the opposite electrode 270 may meet the requirements of design, but the present invention is not limited thereto. Generally speaking, the opposite electrode 270 may be a single-layer conductive layer which may be formed by an inorganic conductive material. The present invention is not limited to the aforesaid material of the organic conductive layers 260c.

Figure 2B:
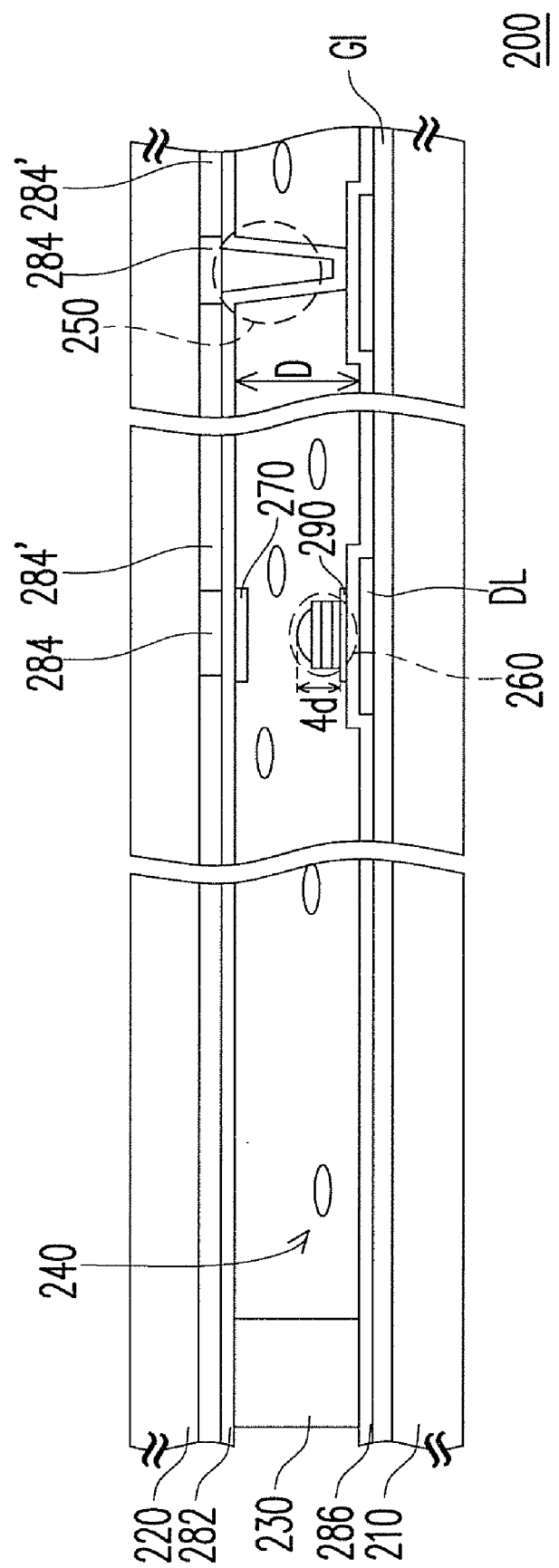
FIG. 2B is a cross-sectional view illustrating a portion of a touch panel in the second embodiment of the present invention.

The sensing spacer 260 may also be disposed on the first substrate 210, and the opposite electrode 270 may be disposed on the second substrate 220 to correspond to the sensing spacer 260, wherein the sensing spacer 260 is formed by the organic conductive material, as shown in FIG. 2B.

FIG. 2B is a cross-sectional view illustrating a portion of a touch panel in the second embodiment of the present invention. Referring to FIG. 2B, the sensing spacer 260 is disposed above the protective layer 286 and the transparent electrode 290, and electrically contacts the transparent electrode 290. Additionally, the opposite electrode 270 or the transparent electrode 290 may also be formed by the inorganic conductive material instead of the organic conductive material. The organic conductive material has been described in the above, and thus the details thereof are omitted here.

In this embodiment, the use of the organic conductive material may be combined with the ink-jet process or other fabricating processes to fabricate the sensing spacer 260. Thereby, the height of the sensing spacer 260 may be easily varied. Moreover, the use of the organic conductive material may also be combined with the ink-jet process or other fabricating processes to form the opposite electrode 270, so as to further adjust the height of the opposite electrode 270.

Figure 3A:
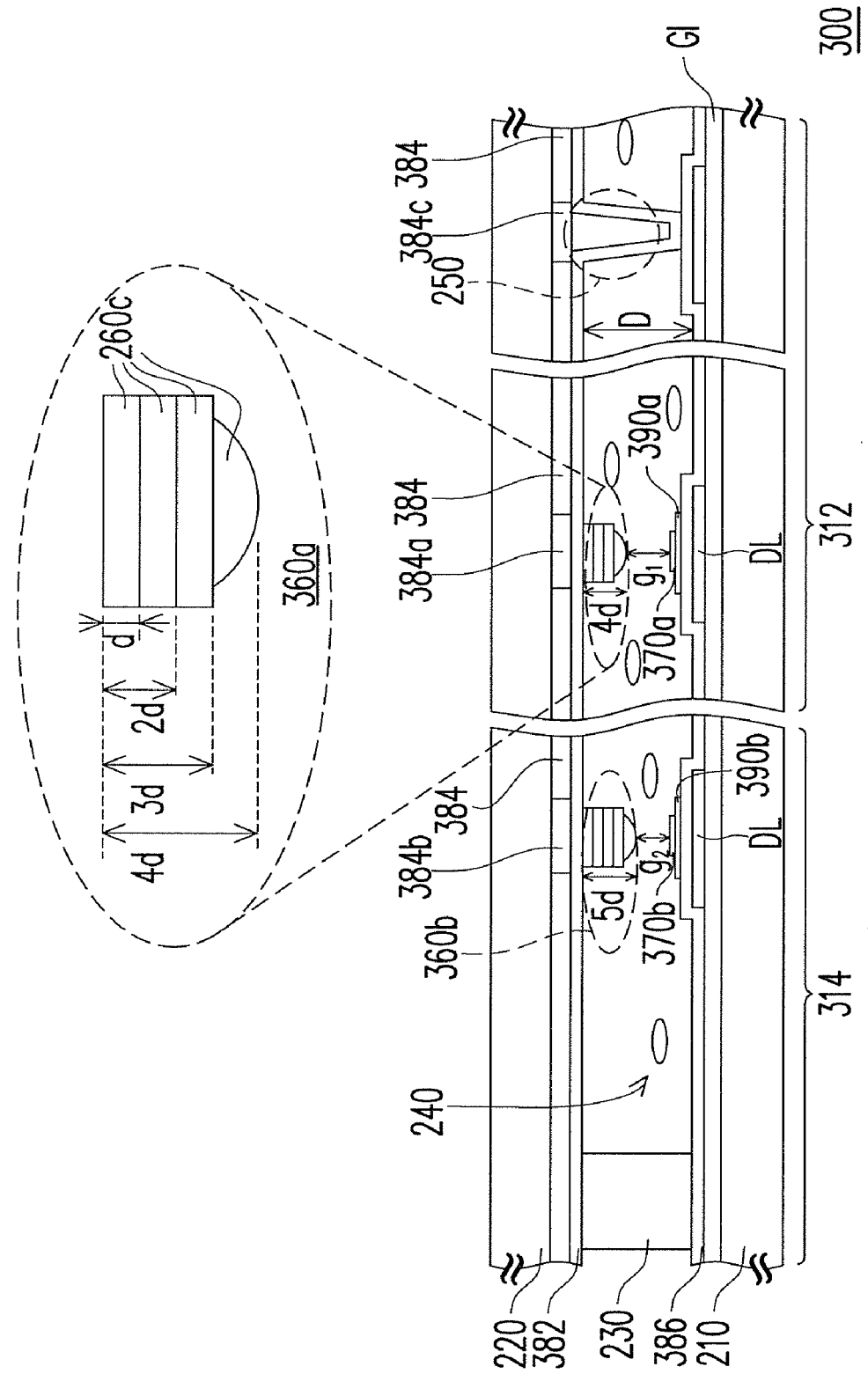
FIG. 3A is a cross-sectional view illustrating a portion of a touch panel in the third embodiment of the present invention.

FIG. 3A is a cross-sectional view illustrating a portion of a touch panel in the third embodiment of the present invention. Referring to FIG. 3A, a touch panel 300 of this embodiment includes the first substrate 210, the second substrate 220, the sealant 230, the liquid crystal layer 240, the main spacer 250, a first sensing spacer 360a, a second sensing spacer 360b, a first opposite electrode 370a, a second opposite electrode 370b, a transparent conductive layer 382, a first shielding layer 384a, a second shielding layer 384b, a third shielding layer 384c, a first transparent electrode 390a, a second transparent electrode 390b, and a protective layer 386.

The first substrate 210 has a central area 312 and a peripheral area 314. Further, a pixel array is disposed on the first substrate 210, wherein the pixel array includes a plurality of active elements, a plurality of scanning lines, a plurality of data lines DL, and a plurality of pixel electrodes. To facilitate the illustration, only the data lines DL are shown in FIG. 3A and other elements are omitted. Persons having ordinary skill in the art should understand the actual positions and functions of the omitted elements. Hence, the details thereof are not described here. As shown in FIG. 3A, the data lines DL are arranged above the gate insulating layer GI.

The second substrate 220 is disposed opposite to the first substrate 210. The sealant 230 is disposed on the peripheral area 314 for bonding the first substrate 210 and the second substrate 220. The liquid crystal layer 240, the main spacer 250, the first sensing spacer 360a, and the second sensing spacer 360b are all arranged between the first substrate 210 and the second substrate 220.

In this embodiment, the first sensing spacer 360a and the second sensing spacer 360b are disposed on the second substrate 220, wherein the first sensing spacer 360a and the main spacer 250 are arranged in the central area 312, and the second sensing spacer 360b is arranged in the peripheral area 314.

The first opposite electrode 370a and the first transparent electrode 390a are disposed on the central area 312 of the first substrate 210 and correspond to the first sensing spacer 360a. The second opposite electrode 370b and the second transparent electrode 390b are disposed on the peripheral area 314 of the first substrate 210 and correspond to the second sensing spacer 360b, wherein the peripheral area 314 usually surrounds the central area 312.

The first opposite electrode 370a, the first transparent electrode 390a, the second opposite electrode 370b, and the second transparent electrode 390b are all disposed above the data lines DL and the gate insulating layer GI. The first transparent electrode 390a and the second transparent electrode 390b are respectively disposed between the first opposite electrode 370a and the second opposite electrode 370b and the corresponding data lines DL. However, the designer may dispose the first opposite electrode 370a and the second opposite electrode 370b above the scanning lines (not shown) or other suitable elements, or alternatively dispose the first opposite electrode 370a and the second opposite electrode 370b between the first transparent electrode 390a and the second transparent electrode 390b and the data lines DL, the scanning lines, or other elements to meet the requirements of products.

In a preferable embodiment, the first transparent electrode 390a and the second transparent electrode 390b are electrically connected with the first opposite electrode 370a and the second opposite electrode 370b respectively for transmitting the electrical changes or sensing signals generated by the contact of the first sensing spacer 360a and the first opposite electrode 370a and the contact of the second sensing spacer 360b and the second opposite electrode 370b when the user touches the touch panel 300. Additionally, the designer may vary the patterns of the first opposite electrode 370a or the second opposite electrode 370b per the requirements of products to substitute for the functions of the first transparent electrode 390a or the second transparent electrode 390b, and further simplify the fabricating process.

In this embodiment, the transparent conductive layer 382 is disposed on the second substrate 220, and the first sensing spacer 360a and the second sensing spacer 360b are disposed on the transparent conductive layer 382 and contact the transparent conductive layer 382. The first shielding layer 384a, and the second shielding layer 384b, and the third shielding layer 384c are disposed on the second substrate 220 and correspond to the first sensing spacer 360a, the second sensing spacer 360b, and the main spacer 250 respectively. Furthermore, pluralities of color filter layers 384 are disposed on the second substrate 220. The color filter layers 384 and the shielding layers 384a, 384b, and 384c are arranged alternately. The protective layer 386 is disposed on the first substrate 210. The first opposite electrode 370a and the second opposite electrode 370b are disposed on the protective layer 386 and contact the protective layer 386 or contact the first transparent electrode 390a and the second transparent electrode 390b on the protective layer 386.

As shown in FIG. 3A, the transparent conductive layer 382 may be electrically connected with the first sensing spacer 360a and the second sensing spacer 360b, and respectively electrically insulated from the first opposite electrode 370a and the second opposite electrode 370b when not operating. When the user touches the central area 312 of the touch panel 300, the touch panel 300 determines the touched area according to the electrical change generated by the contact of the first sensing spacer 360a and the first opposite electrode 370a. Similarly, when the user touches the peripheral area 314 of the touch panel 300, the touch panel 300 determines the touched area based on the electrical change generated by the contact of the second sensing spacer 360b and the second opposite electrode 370b.

The first sensing spacer 360a, the second sensing spacer 360b, the first opposite electrode 370a, and the second opposite electrode 370b may all be formed by multiple organic conductive layers 260c. Generally speaking, the organic conductive layers 260c usually have softer texture for reducing the force generated when the first sensing spacer 360a contacts the first opposite electrode 370a (or when the second sensing spacer 360b contacts the second opposite electrode 370b), so as to reduce the possibility and degree of damaging the transparent conductive layer 382 or other structures. The organic conductive layers 260c may be formed by the materials described in the first embodiment, but the present invention is not limited to the use of these organic conductive materials.

In view of the above, because the first sensing spacer 360a and the second sensing spacer 360b are formed by the organic conductive material having softer texture, the ink-jet process may be used to form the first sensing spacer 360a and the second sensing spacer 360b on the second substrate 220. As shown in FIG. 3A, the first sensing spacer 360a may be formed by four organic conductive layers 260c, and the second sensing spacer 360b may be formed by five organic conductive layers 260c. In other words, the height of the first sensing spacer 360a is 4d and the height of the second sensing spacer 360b is 5d. The height 5d of the second sensing spacer 360b is larger than the height 4d of the first sensing spacer 360a.

In practice, the organic conductive layers 260c are not restricted to four or five layers. The designer may vary the volume and times of jetting the organic conductive material during the ink-jet process based on the requirements of products, so as to control the number and height of the organic conductive layers 260c. Moreover, other fabricating methods or other ink-jet controlling processes may also be applied to form the first sensing spacer 360a and the second sensing spacer 360b as long as the shapes or heights of the first sensing spacer 360a and the second sensing spacer 360b can be controlled. For instance, the height of the organic conductive layer 260c formed in each ink-jet process may also be varied.

In addition, the shape that the organic conductive material is formed on the second substrate 220 may also be adjusted by using the ink-jet process. As shown in FIG. 3A, the first sensing spacer 360a and the second sensing spacer 360b both have spherical tops. However, the tops of the first sensing spacer 360a and the second sensing spacer 360b may also be blunt tops. Herein, the spherical tops or blunt tops of the first sensing spacer 360a and the second sensing spacer 360b help to ease the force which occurs when the first sensing spacer 360a contacts the first opposite electrode 370a (or when the second sensing spacer 360b contacts the second opposite electrode 370b).

One or both of the first sensing spacer 360a and the second sensing spacer 360b may be selected to have the spherical top or the blunt top. That is to say, at least one of the first sensing spacer 360a and the second sensing spacer 360b has the spherical top or the blunt top. Moreover, the designer may dispose the first sensing spacer 360a and the second sensing spacer 360b on the second substrate 200 by performing other fabricating methods according to the requirements of products. Hence, the present invention is not limited to the use of the ink-jet process.

From another aspect, a first sensing pad $g_1$ is arranged between the first sensing spacer 360a and the first opposite electrode 370a, and a second sensing gap $g_2$ is arranged between the second sensing spacer 360b and the second opposite electrode 370b. The first sensing gap $g_1$ is correlated to the height of the first sensing spacer 360a, and the second sensing gap $g_2$ is correlated to the height of the second sensing spacer 360b.

To be more specific, because the main spacer 250 may maintain a gap D between the first substrate 210 and the second substrate 220, the first sensing gap $g_1$ is enlarged when the height of the first sensing spacer 360a decreases. On the contrary, the first sensing gap $g_1$ is narrowed when the height of the first sensing spacer 360a increases. In practice, the gap D does not remain the same in every area. Therefore, the second sensing gap $g_2$ may also be smaller than the first sensing gap $g_1$.

However, the touch panel 300 has different touch sensitivities in different areas. Because the sealant 230 is disposed on the peripheral area 214, the deformation flexibility of the peripheral area 214 is constrained by the sealant 230. Therefore, the peripheral area 214 has lower deformation flexibility and sensitivity than that of the central area 312. To enhance the sensitivity of the peripheral area 214, the second sensing spacer 360b may be disposed close to the second opposite electrode 370b. In other words, the height 5d of the second sensing spacer 360b is larger or the second sensing gap $g_2$ is smaller. The first sensing spacer 360a may be disposed away from the first opposite electrode 370a, i.e. the height 4d of the first sensing spacer 360a is smaller or the first sensing gap $g_1$ is larger.

As shown in FIG. 3A, the second sensing spacer 360b may be formed by the organic conductive layers 260c having the total height of 5d, and the distance between the second sensing spacer 360b and the second opposite electrode 370b is the second sensing gap $g_2$. Further, the first sensing spacer 360a may be formed by the organic conductive layers 260c having the total height of 4d, and the distance between the first sensing spacer 360a and the first opposite electrode 370a is the first sensing gap $g_1$.

Because the second opposite electrode 370b on the peripheral area 314 is closer to the second sensing spacer 360b and the first opposite electrode 370a on the central area 312 is away from the first sensing spacer 360a, the first sensing gap $g_1$ is larger than the second sensing gap $g_2$. On the other hand, there are also other reasons influencing the relationship between the first sensing gap $g_1$ and the second sensing gap $g_2$, the present invention is not limited the reasons. In a preferable embodiment, the range of the first sensing gap $g_1$ or the second sensing gap $g_2$ falls between 0.3 μm and 0.8 μm. Thereby, the touch panel 300 has favorable touch sensitivity.

According to a preferable embodiment, the first sensing spacer 360a, the second sensing spacer 360b, the first opposite electrode 370a, and the second opposite electrode 370b are all formed by multiple organic conductive layers 260c, but the present invention is not limited thereto. That is to say, this embodiment does not require a photomask and photolithography process to form the first sensing spacer 360a, the second sensing spacer 360b, the first opposite electrode 370a, and the second opposite electrode 370b. Moreover, the use of the ink-jet process helps to vary the heights of the first sensing spacer 360a, the second sensing spacer 360b, the first opposite electrode 370a, and the second opposite electrode 370b.

Figure 3B:
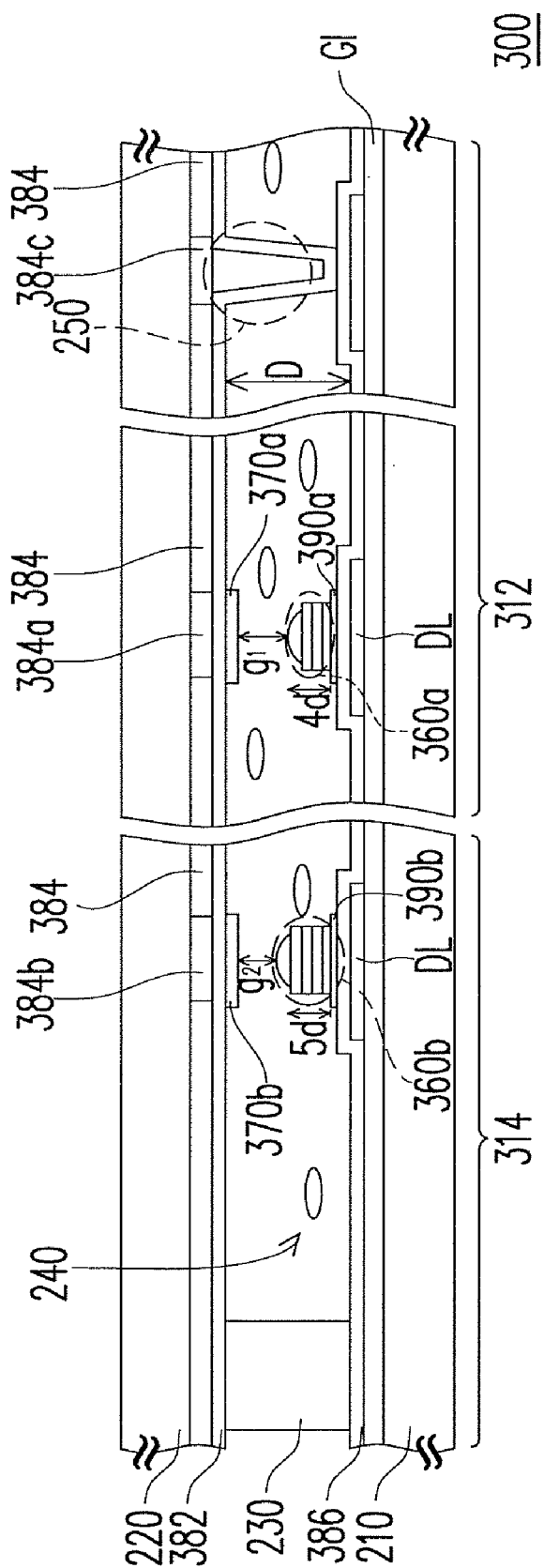
FIG. 3B is a cross-sectional view illustrating a portion of a touch panel in the fourth embodiment of the present invention.

The first sensing spacer 360a and the second sensing spacer 360b may also be disposed on the first substrate 210, and the first opposite electrode 370a and the second opposite electrode 370b may be disposed on the second substrate 220 to respectively correspond to the first sensing spacer 360a and the second sensing spacer 360b, wherein the first sensing spacer 360a and the second sensing spacer 360b are formed by the organic conductive material, as shown in FIG. 3B.

FIG. 3B is a cross-sectional view illustrating a portion of a touch panel in the fourth embodiment of the present invention. It is known from FIG. 3B that the first sensing spacer 360a and the second sensing spacer 360b are respectively arranged above the first transparent electrode 390a and the second transparent electrode 390b of the protective layer 286, and contact the first transparent electrode 390a and the second transparent electrode 390b.

In other embodiments, one of the first sensing spacer 360a and the second sensing spacer 360b may be selected to be formed by the organic conductive layers 260c, and one of the first opposite electrode 370a and the second opposite electrode 370b may be selected to be formed by the organic conductive layers 260c. In a word, at least one of the first sensing spacer 360a and the second sensing spacer 360b is formed by the organic conductive layers 260c. Similarly, at least one of the first opposite electrode 370a and the second opposite electrode 370b is formed by the organic conductive layers 260c.

In addition, this embodiment may make use of the ink-jet process to dispose the first, the second sensing spacers 360b, 360b or the first, the second opposite electrodes 370a, 370b on the first substrate 210 or the second substrate 220. It is certain that other suitable methods may also be adapted to form the first, the second sensing spacers 360a, 360b or the first, the second opposite electrodes 370a, 370b. The present invention is not intended to limit the forming methods thereof.

It is known from the above that the touch sensitivity of the peripheral area 314 may be enhanced by making the first sensing gap $g_1$ larger than the second sensing gap $g_2$. In other embodiment, any persons having ordinary skill in the art may dispose the first sensing spacer 360a on the first substrate 210 (disposing the first opposite electrode 370a on the second substrate 220) and dispose the second sensing spacer 360b on the second substrate 220 (disposing the second opposite electrode 370b on the first substrate 210), so as to make the first sensing gap $g_1$ larger than the second sensing gap $g_2$. Alternatively, the first sensing spacer 360a may be disposed on the second substrate 220 (disposing the first opposite electrode 370a on the first substrate 210) and the second sensing spacer 360b may be disposed on the first substrate 210 (disposing the second opposite electrode 370b on the second substrate 220) to achieve the same effect.

To solve the problem that the peripheral area 314 has low touch sensitivity, this embodiment makes the first sensing gap $g_1$ in the touch panel 300 larger than the second sensing gap $g_2$, and thereby improves the touch sensitivity of the peripheral area 314. In addition, the first sensing spacer 360a or the second sensing spacer 360b has the spherical top or blunt top which serves as a buffer between the first sensing spacer 360a or the second sensing spacer 360b and the first opposite electrode 370a or the second opposite electrode 370b for preventing the breaking or damage to the transparent conductive layer 382 or other structures caused by excessive stress.

In conclusion, the embodiments mentioned above of the present invention make use of the organic conductive material to form the sensing spacers, which is adapted for adjusting the sensing spacers. As a consequence, the touch sensitivity of certain areas having worse sensitivity in the touch panel is enhanced, and the touch panel can have uniform touch sensitivity. Different products may include sensing spacers of different heights, but the present invention is not required to change photomask for different products during the production. Moreover, using the organic conductive material to form the opposite electrodes facilitates the adjustment of the sensing gaps. Therefore, the sizes of the sensing gaps may be varied more flexibly. Because the organic conductive material has softer texture in some embodiments, the possibility of damaging the touch panel is also greatly reduced.

Although the present invention has been disclosed by the above embodiments, they are not intended to limit the present invention. Anybody with ordinary knowledge in the art may make some modifications and alterations without departing from the spirit and scope of the present invention. Therefore, the protection range of the present invention falls in the appended claims.

What is claimed is:

1. A touch panel, comprising:
    a first substrate, having a central area and a peripheral area;
    a second substrate, disposed opposite to the first substrate;
    a sealant, disposed on the peripheral area for bonding the first and the second substrates;
    a liquid crystal layer, disposed between the first substrate and the second substrate;
    a main spacer, disposed between the first substrate and the second substrate;
    a first sensing spacer, disposed on the central area and between the first substrate and the second substrate;
    a second sensing spacer, disposed on the peripheral area and between the first substrate and the second substrate;
    a first opposite electrode, disposed corresponding to the first sensing spacer, and a first sensing gap being arranged between the first sensing spacer and the first opposite electrode; and
    a second opposite electrode, disposed corresponding to the second sensing spacer, a second sensing gap being arranged between the second sensing spacer and the second opposite electrode, and the first sensing gap being larger than the second sensing gap.

2. The touch panel as claimed in claim 1, wherein at least one of the first sensing spacer and the second sensing spacer comprises multiple organic conductive layers.

3. The touch panel as claimed in claim 2, wherein a material of the organic conductive layers may be selected from a group of poly(3,4-ethylene dioxythiophene)/poly(styrene sulfonate) (PEDOT/PSS), polyaniline, polypyrrole, polythiophene, polyacetylene, polyphenyl, polyfuran, polyselenophene, isothianaphthene, polyphenylsulfide, polystyrene, polythienylstyrene, polynaphthalene, polyanthracene, polypyrene, polyazulene, phthalocyanine, pentacene, hemicyanine dye, and 3,4-polyethylene dioxythio phene (PEDT).

4. The touch panel as claimed in claim 1, wherein at least one of the first opposite electrode and the second opposite electrode comprises multiple organic conductive layers.

5. The touch panel as claimed in claim 4, wherein the material of the organic conductive layers may be selected from a group of poly(3,4-ethylene dioxythiophene)/poly(styrene sulfonate) (PEDOT/PSS), polyaniline, polypyrrole, polythiophene, polyacetylene, polyphenyl, polyfuran, polyselenophene, isothianaphthene, polyphenylsulfide, polystyrene, polythienylstyrene, polynaphthalene, polyanthracene, polypyrene, polyazulene, phthalocyanine, pentacene, hemicyanine dye, and 3,4-polyethylene dioxythio phene (PEDT).

6. The touch panel as claimed in claim 1, wherein the first sensing gap or the second sensing gap ranges from 0.3 µm to 0.8 µm.

7. The touch panel as claimed in claim 1, wherein at least one of the first sensing spacer and the second sensing spacer has a spherical top or a blunt top.

8. The touch panel as claimed in claim 1, further comprising a transparent conductive layer, the first sensing spacer and the second sensing spacer disposed on the transparent conductive layer, and the first sensing spacer and the second sensing spacer contacting the transparent conductive layer.

9. The touch panel as claimed in claim 1, further comprising a first shielding layer, a second shielding layer, and a third shielding layer disposed on the second substrate.

10. The touch panel as claimed in claim 9, wherein the first shielding layer, the second shielding layer, and the third shielding layer are arranged corresponding to the first sensing spacer, the second sensing spacer, and the main spacer respectively.

11. The touch panel as claimed in claim 1, further comprising a protective layer disposed on the first substrate and a plurality of transparent electrodes disposed on the protective layer, and the transparent electrodes being arranged corresponding to the first sensing spacer and the second sensing spacer.

12. The touch panel as claimed in claim 11, wherein the first opposite electrode and the second opposite electrode are separately disposed on the transparent electrodes.

13. A touch panel, comprising:
    a first substrate, having a central area and a peripheral area;
    a second substrate, disposed opposite to the first substrate;
    a sealant, disposed on the peripheral area for bonding the first and the second substrates;
    a liquid crystal layer, disposed between the first substrate and the second substrate;
    a main spacer, disposed between the first substrate and the second substrate;
    a first sensing spacer, disposed on the central area and between the first substrate and the second substrate; and
    a second sensing spacer, disposed on the peripheral area and between the first substrate and the second substrate, and the second sensing spacer being higher than the first sensing spacer.

14. The touch panel as claimed in claim 13, further comprising a first opposite electrode disposed corresponding to the first sensing spacer and a second opposite electrode disposed corresponding to the second sensing spacer.

15. The touch panel as claimed in claim 13, wherein at least one of the first sensing spacer and the second sensing spacer comprises multiple organic conductive layers.

* * * * *